(12) United States Patent
Fritzsching et al.

(10) Patent No.: US 8,691,304 B2
(45) Date of Patent: Apr. 8, 2014

(54) ISOMALTULOSE IN CEREAL PRODUCTS

(71) Applicant: Sudzucker Aktiengesellschaft Mannheim/Ochsenfurt, Mannheim (DE)

(72) Inventors: Bodo Fritzsching, Laudenbach (DE); Jorg Kowalczyk, Eisenberg/Steinborn (DE)

(73) Assignee: Sudzucker Aktiengesellschaft Mannheim/Ochsenfurt, Mannheim (DE)

( * ) Notice: Subject to any disclaimer, the term of this patent is extended or adjusted under 35 U.S.C. 154(b) by 0 days.

(21) Appl. No.: 13/945,633

(22) Filed: Jul. 18, 2013

(65) Prior Publication Data

US 2013/0302488 A1 Nov. 14, 2013

Related U.S. Application Data

(63) Continuation of application No. 11/817,959, filed as application No. PCT/EP2006/001854 on Mar. 1, 2006, now Pat. No. 8,512,777.

(30) Foreign Application Priority Data

Mar. 7, 2005 (DE) .......................... 10 2005 010 834

(51) Int. Cl.
*A23G 3/00* (2006.01)

(52) U.S. Cl.
USPC ............... 426/93; 426/18; 426/443; 426/618

(58) Field of Classification Search
USPC .......................................................... 426/93
See application file for complete search history.

(56) References Cited

U.S. PATENT DOCUMENTS

| 5,292,536 | A | 3/1994 | Sato et al. |
| 5,399,365 | A | 3/1995 | Yatka et al. |
| 6,555,146 | B1 | 4/2003 | Rapp et al. |
| 6,558,718 | B1 | 5/2003 | Evenson et al. |
| 2002/0028276 | A1 | 3/2002 | Rapp et al. |
| 2004/0013771 | A1 | 1/2004 | Funk et al. |
| 2004/0219280 | A1 | 11/2004 | Green et al. |

FOREIGN PATENT DOCUMENTS

| EP | 0434025 | A2 | 6/1991 |
| GB | 2066640 | A | 7/1981 |
| JP | 2000-342185 | A | 12/2000 |
| WO | WO-0221937 | A2 | 3/2002 |

OTHER PUBLICATIONS

Japan Food Science, 1996, vol. 2, pp. 55-59.

*Primary Examiner* — Patricia George
(74) *Attorney, Agent, or Firm* — Dickstein Shapiro LLP

(57) ABSTRACT

The present invention relates to cereal products comprising cereals and isomaltulose, methods for their production, and the use of isomaltulose for the production of cereal products.

19 Claims, No Drawings

ISOMALTULOSE IN CEREAL PRODUCTS

This is application is a Continuation of application of U.S. patent application Ser. No. 11/817,959, filed Nov. 30, 2007, now U.S. Pat. No. 8,512,777, which is a national phase application under 35 U.S.C. §371 of International Patent Corporation Treaty Application No. PCT/EP2006/001854, filed Mar. 1, 2006, which claims priority to German Patent Application No. 10 2005 010 834.2, filed Mar. 7, 2005. The entire contents of which are incorporated herein by reference.

DESCRIPTION

The present invention relates to cereal products in coated and non-coated form, methods for producing coated and non-coated cereals, and the use of isomaltulose for producing cereal products, whereby the isomaltulose serves as binding agent and/or as components of a coating solution or a coating syrup.

Cereals, i.e. grain products, in particular made of corn (maize), wheat, rice, oat, barley or rye, usually comprise vitamins, minerals, and dietary fibers and are established as nutrition-physiologically important components of today's nutrition. They usually have a beneficial influence on the blood sugar level and cholesterol values and thus contribute to maintaining the health of the consumer.

Accordingly, from EP 0 434 025 B1, cereals in the form of crispies are known. Crispies are extrudates made of one or more types of flour or from puffed cereal grains the production of which involves the addition of sugar and other flavor-conferring components. The European patent specification referred to above provides formulas and methods for producing crispies with improved nutrition-physiological properties. This is achieved by providing sucrose-free crispies comprising polyols or sugar alcohols such as sorbitol, mannitol, xylitol, maltitol, lactitol or isomalt as sugar substitutes.

U.S. Pat. No. 6,475,540 B1 discloses cereals, in which the sucrose that is usually present is partly or completely replaced by tagatose or mixtures of tagatose and polyols such as sorbitol, maltitol, isomalt, erythritol, xylitol, lactitol or hydrated corn syrup.

One disadvantage commonly associated with the use of polyols is their laxative effect. Moreover, many polyols, such as sorbitol or maltitol, are hygroscopic or, like lactitol, characterized by notably reduced sweetness as compared to sucrose. Other polyols, such as xylitol or erythritol, confer a cooling effect to the consumer which is undesirable in cereals. Moreover, the polyols usually show no Maillard browning, though this is often desired in particular in cereals. Lastly, it has been evident that the use of sugar substitutes is still not acceptable to many consumers who do not accept the products, usually advertised as "sugar-free", to the desired degree.

The present invention is therefore based on the technical problem to provide cereal products that are largely free of common sugars, such as sucrose or glucose, that are unsuitable for diabetics, but, at the same time, do not comprise the disadvantages that are associated with the use of sugar substitutes.

The present invention solves the underlying technical problem by providing a cereal product, comprising a) cereals bound together by at least one binding agent, and/or b) cereals comprising at least one coating, whereby the cereal product contains 50 to 95% by weight (relative to the total dry substance of the cereal product), cereals and 5 to 50% by weight (relative to the total dry substance of the cereal product) isomaltulose. The cereal products according to the invention can therefore comprise a isomaltulose-containing coating and/or a isomaltulose-containing binding agent.

The invention therefore provides a cereal product that contains a significant fraction of cereals, i.e. 50 to 95% by weight, preferably more than 50% by weight to 95% by weight, in particular 60 to 95% by weight, 70 to 95% by weight, 80 to 95% by weight or, particularly preferred, 90% by weight to 95% by weight (relative to the total dry substance of the cereal product) cereals and, in addition, a fraction of 5 to 50% by weight (relative to the total dry substance content of the cereal product) of the sugar, isomaltulose (6-O-.alpha.-D-glucopyranosyl-fructose or Palatinose™).

In a particularly preferred embodiment, the invention provides cereal products made up of a cereal core, in particular a core comprising cereals and, optionally, preferably at least one binding agent, and at least one coating that is applied onto the core. A particularly preferred embodiment can provide the isomaltulose to be present both in the core and in the coating. A further embodiment can provide the isomaltulose to be present solely in the core, but not in the coating. A further preferred embodiment can provide the isomaltulose to be present solely in the coating, but not in the core.

A further preferred embodiment provides the isomaltulose as the sole sugar added in the cereal product. A further preferred embodiment provides the isomaltulose as the sole bulking (body-providing) sweetening agent added in the cereal product. A further preferred embodiment provides the isomaltulose as the sole sweetening agent added in the cereal product. In a particularly preferred embodiment, the invention provides cereal products that are free of sucrose or free of glucose or free of fructose or free of mixtures of two or all of the three sugars specified above, for example are free of invert sugar.

In the context of the present invention, the term, "sweetening agent", is taken to mean substances that possess sweetening power and are added, for example, to foods or beverages in order to produce a sweet flavor. In the context of the present invention, the "sweetening agents" shall be subdivided as "sugars", such as sucrose, glucose or fructose, that provide body and sweetening power, and as "sweetening means", i.e. substances that are not sugars but still possess sweetening power, with the latter being further subdivided as "sugar substitutes", i.e. sweetening agents possessing a body and a physiological caloric value in addition to their sweetening power (body-providing sweetening means), and as "intensive sweetening means", i.e. substances that usually have very high sweetening power, but no body and usually no or little physiological caloric value.

Accordingly, a particularly preferred embodiment provides the isomaltulose as the sole sweetening agent added in the cereal product, i.e., other than isomaltulose, no sugars, no intensive sweetening means, and no sugar substitutes and/or sugar alcohols were added in the cereal product. However, the isomaltulose can also be provided as the sole body-providing sweetening agent added in the cereal product, i.e. other than isomaltulose, no sugars, no intensive sweetening means, and no sugar substitutes and/or sugar alcohols were added in the cereal product. A further embodiment can provide the isomaltulose as the sole sugar added in the cereal product, i.e. no other sugars were added.

Accordingly, in the context of the present invention, the terms, "sole added" sugar or "sole added" sweetening agent, are taken to mean that, other than isomaltulose, no other sugars or sweetening agents or body-providing sweetening agents are added during the production of the cereal product. However, depending on the type and source of the raw materials used, endogenous sugars, including sucrose or glucose, may be present in the cereal product itself. These sugars that are present naturally in the raw materials, though, are the sugars produced by photosynthesis by the source plant of the cereal.

In as far as reference is made to sucrose-, glucose- or fructose-free cereal products or "added sugars" or "added sweetening agents" in the context of the present invention, this shall not extend to sugars or sugar alcohols that are produced naturally by photosynthesis and are present endogenously in the cereal.

In the context of the present invention, cereals shall be taken to mean cereal products or cereal substitute products, in particular muesli, salty snacks, breakfast products or energy bars made up to a predominant extent of cereal grains, cereal flakes, cereal granulates, cereal extrudates, cereal flour, cereal powder, cereal agglomerates or their substitute products such as soy preparations, for example soy beans, soy flour, soy agglomerate, soy granulate, soy extracts, and soy powder, and, in addition, contain at least one binding agent binding together these cereal and/or soy products. The cereal used can be soft or durum wheat, spelt, rye, oat, corn (maize), barley, rice, sorghum, millet, triticale, buckwheat, amaranth, quinoa, or substance similar to soy. A preferred embodiment of the present invention uses isomaltulose as binding agent for the cereals.

In a particularly preferred embodiment, the cereal product of the present invention comprises 5 to 50% by weight (relative to the total dry substance of the cereal product), in particular 10 to 35% by weight (relative to the total dry substance of the cereal product), preferably 20 to 30% by weight (relative to the total dry substance of the cereal product) isomaltulose, whereby the isomaltulose is present solely in the core, is present solely in the coating, and is present both in the core and in the coating in a first preferred embodiment, in a second preferred embodiment, and in a third preferred embodiment, respectively.

Therefore, in a particularly preferred embodiment, the cereal product of the present invention comprises the isomaltulose solely in the coating or both in the coating and in the core.

In the core, the isomaltulose functions as binding agent and as body-providing sweetening agent; in the coating it functions as coating agent and as body-providing sweetening agent.

A further preferred embodiment provides the coating of the cereal product to consist, essentially consist or contain significant fractions of isomaltulose. According to the invention, a particularly preferred embodiment can provide the coating of the cereal product to comprise 10 to 100% by weight, preferably 20 to 90% by weight, preferably 30 to 80% by weight isomaltulose (each relative to the total dry substance of the coating). In one embodiment of the present invention, several or many layers can be provided, whereby these can be identical or differ from each other in terms of their composition or type of application. The dry substance fraction of the coating in the total cereal product can, in a preferred embodiment, be 0 to 50% by weight, preferably 2 to 40% by weight, preferably 5 to 30% by weight, in particular 10 to 25% by weight, each relative to the dry weight of the cereal product.

In a particularly preferred embodiment, the cereal products according to the invention are provided to contain at least one additive in the core and/or in the coating.

In the context of the present invention, "additives" shall be taken to mean substances that can be added to the cereal product according to the invention in addition to isomaltulose and the cereals. Accordingly, the additives are substances that can be used optionally, and the invention thus relates to cereal products according to the invention comprising these substances or a selection thereof as well as to cereal products not comprising any or all of the additives specified. The use of the additives can be decided individually on the basis of the application field and requirement profile of the markets and consumers at hand.

In the context of the present invention, an "additive" is taken to mean, for example, a prebiotic with an advantageously positive influence on the nutrition-physiological properties of the cereal product, an intensive sweetening means, a sugar or a sugar substitute affecting the sweetening power of the cereal product, a fat-containing component or a dairy or milk product influencing in particular the type and flavor of the product thus attained, or a supplement.

A "supplement" shall be taken to mean substances affecting, in particular, the appearance, flavor, organoleptic properties, nutritional value, nutrition-physiological properties, processability, shelf-life or readiness for use of the cereal product.

Accordingly, a further preferred embodiment provides the at least one additive to be provided as a prebiotic, preferably inulin, oligofructose, resistant starch, β-glucanes or galactooligosaccharide.

In the context of the present invention, a "prebiotic" is taken to mean an additive that selectively stimulates the growth and/or activity of specific bacteria in the digestive tract of humans or animals, in particular bifidobacteria and/or lactobacilli such that health-promoting effects are to be expected or in fact occur.

In the context of the present invention, a "probiotic" is taken to mean a viable microbial additional component that promotes the health of the human or animal consuming it by stabilizing or improving the microbial composition of the digestive tract. Probiotic microorganisms of this type that can be used, for example, in foods include, for example: *Bifidobacterium* including the strains *B. adolescentis, B. animalis, B. bifidum, B. longum, B. thermophilum; Enterococcus; Lactobacillus* including the strains *Lb. acidophilus, Lb. brevis, Lb. casei, Lb. cellobiosus, Lb. crispatus, Lb. delbrueckii* subsp. *Bulgaricus, Lb. fermentum, Lb. GG, Lb. johnsonii, Lb. lactis, Lb. plantarum, Lb. reuteri, Lb. rhamnosus, Lb. salivarius; Bacillus cereus toyoi; Bacillus cereus; Leuconostoc; Pediococcus acidilactici; Propionibacterium; Streptococcus* including the strains *S. cremoris, S. infantarius, S. intermedius, S. lactis, S. salivarius* subsp. *thermophilus* (see Fuller, J. Appl. Bacteriol. (1989)). Bacteria of the genera, *Lactobacillus* and *Bifidobacterium*, are preferred probiotics.

In the context of the present invention, "synbiotic" is taken to mean a mixture of at least one prebiotic and at least one probiotic that promotes the health of the human or animal consuming it by improving the survival rate and increasing the number of health-promoting viable microbial organisms in the gastrointestinal tract, in particular by selectively stimulating the growth and/or metabolic activity of the microbial organisms.

A further preferred embodiment provides the at least one additive to be provided as a probiotic, preferably bifidobacteria or lactobacteria. Probiotic bacterial cultures of this type can preferably be provided in the form of dry cultures or permanent cultures. A further preferred embodiment provides for the use of synbiotics, i.e. mixtures of probiotics and prebiotics.

The invention also provides for the at least one additive to be provided as a fat-containing component, for example cocoa mass, hardened or non-hardened plant fat or similar substance, for example as a fat substitute.

A further preferred embodiment of the invention provides for the at least one additive to be provided in the form of a dairy or milk product, in particular lactose-free milk product, for example skimmed milk powder, whole milk powder, lactose-free skimmed or whole milk powder, whey extract, whey product. In this embodiment, i.e. a cereal product containing isomaltulose, a milk product, and a cocoa component, it is preferably provided to use the milk product at a fraction equal to 2 to 40% by weight, preferably 5 to 20% by weight (relative to the total weight of the cereal product). Particularly the latter embodiment preferably provides for the use of isomaltulose at a fraction equal to 20 to 50% by weight (relative to the total weight of the cereal product).

A further preferred embodiment provides for the at least one additive to be a sugar, for example sucrose, glucose, fructose, maltose, lactose, rice starch, corn (maize) starch, potato starch or a mixture of two or more of these.

Likewise, one embodiment of the invention relates to cereal products according to the invention which, aside from their isomaltulose content of at least 5% by weight, contain sweeteners, for example sugar substitutes or intensive sweetening means.

One embodiment of the invention provides for the sugar substitute to be, in particular, a sugar alcohol and to be selected particularly from the group consisting of isomalt, 1,1-GPM (1-O-α-D-glucopyranosyl-D-mannitol), 1,6-GPS (6-O-α-D-glucopyranosyl-D-sorbitol), 1,1-GPS (1-O-α-D-glucopyranosyl-D-sorbitol), maltodextrins, lactitol, maltitol, erythritol, xylitol, mannitol, sorbitol, maltitol syrup, hydrated and non-hydrated starch hydrolysates, and a mixture of two or more of these.

Therefore, a further preferred embodiment provides for the coating of the cereal product to comprise, aside from isomaltulose, one or more polyols, for example, sorbitol, maltitol, erythritol, xylitol, lactitol, mannitol or isomalt or a mixture of these.

Therefore, provided the isomaltulose is present in the core as binding agent, a further preferred embodiment can provide the isomaltulose to be used there jointly with one or more polyols, if applicable, for example sorbitol, maltitol, mannitol, isomalt, erythritol, xylitol or lactitol or a mixture of these.

A further preferred embodiment provides for the intensive sweetening means to be selected from the group consisting of sucralose, sodium cyclamate, acesulfame K, neohesperidine-dihydrochalcone, glycyrrhizine, stevioside, monellin, thaumatin, aspartame, dulcin, saccharine, naringin-dihydrochalcone, neotame, and a mixture of two or more of these.

A particularly preferred embodiment of the invention provides for the at least one additive to be provided in the form of a supplement and to be selected from the group consisting of aroma substances, such as vanillin, food dyes, flavorings, minerals such as sodium or calcium, in particular salts such as sodium chloride, vitamins, folic acid, emulsifying agents, lecithin, dietary fibers, L-carnitine, omega-3 fatty acids, medium chain length triglycerine, phytoestrogens, and ascorbic acid salts or combinations thereof.

Likewise, according to the invention, it is provided that the cereal product, in addition, can contain natural and/or synthetic dyes. The natural dyes can be, for example, dyes of plant origin, such as carotinoids, flavonoids, and anthocyans, dyes of animal origin such as cochineal, inorganic pigments such as titanium dioxide, iron oxide pigments, and iron hydroxide pigments. Secondarily formed dyes such as the products of enzymatic browning, for example polyphenols, and products of non-enzymatic browning, such as melanoidines, can also be used as natural dyes. Moreover, the invention provides for heating products such as caramel and sugar coloring to be used as natural dyes. Moreover, synthetic dyes such as azo-, triphenylmethane, indigoid, xanthene, and quinoline compounds can be used as synthetic dyes for the cereal products according to the invention.

According to the invention, the cereal products according to the invention can, in addition, be fortified with natural or synthetic vitamins selected from the group consisting of vitamin A, vitamin $B_1$, vitamin $B_2$, vitamin $B_3$, vitamin $B_5$, vitamin $B_6$, vitamin $B_{12}$, vitamin B complex, vitamin C, vitamin D, vitamin E, vitamin F, and vitamin K. The cereal products according to the invention can contain additional minerals and trace elements.

According to a particularly preferred embodiment of the invention the cereal product of the present invention can comprise not only one, but several additives, for example two, three, four, five, six or more additives.

In a particularly preferred embodiment of the present invention, the cereals are present in unprocessed, extruded, cooked or puffed form.

The cereal products according to the invention can be muesli bars, salty snacks, energy bars, and breakfast products, in particular clusters, muesli, corn flakes, puffed corn, puffed rice, loops, flakes, beads, mini cereal bars or crispies.

In a further preferred embodiment of the present invention, the invention relates to a method for producing a cereal product, in particular of the type specified above, including the following steps: a) providing the cereals and the at least one binding agent and, if applicable, at least one additive; b) contacting the cereals and the binding agent and, if applicable, the at least one additive; and c) solidifying the binding agent and, if applicable, at least one additive and the cereals to form an agglomerate of cereals and binding agent and additive, if any is present; whereby the binding agent consists, essentially consists or contains significant fractions of isomaltulose, in particular 30 to 100% by weight, 40 to 90% by weight, preferably 50 to 80% by weight isomaltulose (relative to the total dry substance of the binding agent). A preferred embodiment of the invention provides the binding agent in step a) in the form of an aqueous binding agent solution or a binding agent syrup, for example with a dry substance content of 60-90%, preferably 70-80% by weight. If applicable, aside from the isomaltulose, at least one further binding agent can be present in the binding agent, for example polydextrose. In a preferred embodiment, the contacting in step b) can proceed by means of extrusion.

A further preferred embodiment provides for the contacting of the cereal and the binding agent, in particular in the form of an aqueous solution of the binding agent, provided in step b) to proceed at elevated temperature, for example 70 to 110° C., preferably 80 to 100° C. A further preferred embodiment provides for a drying of the agglomerate obtained to be performed subsequent to step c), for example at 120 to 140° C.

A further preferred embodiment provides for the thus produced cereal product to be selected from the group of muesli bars, energy bars, salty snacks, and breakfast products, in particular flakes, loops, mini cereal bars, beads, corn flakes, puffed corn, puffed rice, muesli, crispies, and clusters.

A further preferred embodiment of the invention provides a method for the production of a frosted or glazed cereal product, in particular of the type specified above, whereby this comprises a core of cereals and a coating, whereby in one procedural step i) the core is coated with a coating solution or a coating syrup or a coating melt, while the cores are being moved, if applicable; ii) the coating thus obtained is dried; and iii) a coated cereal product is obtained, whereby the coating solution or the coating syrup consists of isomaltulose provided in aqueous media or the coating melt consists, essentially consists or contains significant fractions of melted isomaltulose, in particular 20 to 100% by weight, preferably 20 to 90% by weight, in particular 40 to 90% by weight, preferably 50 to 80% by weight isomaltulose and particularly preferred 70 to 90% by weight isomaltulose (each relative to the total dry substance of the coating solution or the syrup or the melt). A particularly preferred embodiment provides the coating solution or suspension or syrup or the melt to have a temperature of 70° C. to 180° C., in particular 80° C. to 110° C., and therefore be used at this temperature for the coating in step i). In a preferred embodiment of the present invention, the total dry substance content of the coating solution or syrup preferably is 70 to 90% by weight (relative to the weight of the solution or syrup).

In the case of highly concentrated solutions or melts of isomaltulose, a temperature of 150 to 180° C., in particular 140 to 150° C. can be used to produce the solution or melt in a preferred embodiment of the present invention. In this embodiment of the highly concentrated solution or melt, the temperature is subsequently maintained above/at 135° C. during the coating in step i). In this context, highly concentrated solutions or melts are taken to mean, in particular, a solution or melt with a dry substance content of 90 to 100% by weight TS (dry substance) (relative to the total weight of the solution or melt).

A core that is used in a coating procedure according to the invention can, for example, be produced according to the procedure of the invention specified above, namely by using a isomaltulose-containing binding agent. However, it can also be provided to use a cereal core whose cereals are bound together by a binding agent of a different type or composition.

A further preferred embodiment can provide the cereal core for coating to be selected from extruded, cooked, and puffed cereals, in particular from loops, mini cereal bars, beads, crispies, puffed rice, puffed corn (maize), corn flakes, salty snacks, muesli, and clusters.

In a particularly preferred embodiment of the present invention, the coating in step ii) is dried at a temperature above 100° C., for example 120° C. to 130° C., preferably 125° C. to 130° C., and thus a glazed cereal product with a cereal core and a glass-like amorphous coating ("glazing") is obtained. The "glazing" according to the invention can, in a preferred embodiment, also be carried out with highly concentrated solution or melt of the type specified above.

A particularly preferred embodiment provides a method of the type described above for the production of a glass-like amorphous coating, whereby the cereal product obtained is cooled, in particular while being moved, subsequent to the application of the amorphous coating and drying.

In a different embodiment of the present invention, a method is preferred, according to which the coating in step ii) of the present procedure is dried at a temperature below 85° C., preferably 50 to 70° C., particularly preferably 50 to 60° C., and thus a frosted cereal product with a cereal core and a crystalline coating ("frosting") is obtained, whereby, in a preferred embodiment, the coated products are moved during the drying in step ii). In a preferred embodiment of the present invention, the "frosting" according to the invention is carried out with a coating solution or syrup with a dry substance content of 70 to 90% by weight of dry matter (relative to the total weight of the solution or syrup).

A further preferred embodiment provides the coating solution or the coating syrup or the coating melt to contain at least one additive. In a preferred embodiment, this additive is selected from the group consisting of sweeteners, corn (maize) starch, potato starch, rice starch, .beta.-glucan, resistant starch, intensive sweetening means (intensive sweeteners), in particular as acesulfame K, sucralose, cyclamate, stevioside, neohesperidine-dihydrochalcone, aroma substances, spices, omega-3-fatty acid, L-carnitine, fats, emulsifying agents, acids for consumption, soluble and insoluble dietary fibers such as inulin and oligofructose, consistency-providing substances, binding agents, dyes, and preservatives.

The invention also relates to the coated and non-coated products produced by means of the methods according to the invention.

The invention also relates to the use of isomaltulose for producing a cereal product of the type specified above, in particular as binding agent and/or as component of a coating solution or a coating syrup or a coating melt.

Further advantageous developments are evident from the dependent claims.

The invention shall be illustrated in more detail based on the following examples.

EXAMPLE 1

Production of Frosted, Coated Cereal Products Using Isomaltulose

Cooked, puffed or extruded cereals, for example rings or small beads, corn flakes or puffed rice, are heated in hot air at 80-95° C. and then inserted into a rotating drum.

An aqueous isomaltulose solution is prepared from 75% isomaltulose and 25% water, adding 0.05% acesulfame K or 0.02% sucralose (all in % by weight, relative to the total solution), if applicable. This is done by mixing isomaltulose, the intensive sweetening means, if applicable, and water and heating to 105° C., whereby all crystals are dissolved. The dry substance content is adjusted to 77-79% by weight of dry matter isomaltulose. The solution thus obtained is then brought to a temperature of 80 to 100° C. and maintained at this temperature throughout the subsequent coating procedure. In order to apply the coating solution to the cereals, 500 g of the isomaltulose solution thus produced are slowly added to 1000 g of the cereals in the rotating drum. Coating is allowed to proceed for 0.5 to 1 minute. After coating, a crystalline layer on the product can be detected by eye. The product is dried with dry and warm air at a temperature of 60 to 80° C. under agitation in the rotating drum. Alternatively, it can be provided to dry the product for 10 minutes in an oven at 60 to 80° C. After approx. 10 minutes of drying, the crystalline coating is essentially dry and completely white and crystalline in appearance. The product thus obtained is subsequently cooled down to room temperature before packaging.

EXAMPLE 2

Production of a Cereal Product with a Glass-Like Coating Using Isomaltulose

Cooked, puffed or extruded cereals, for example rings, small beads, corn flakes or puffed rice, are heated in hot air at 80-95° C. and then inserted into a rotating drum.

An aqueous isomaltulose solution is prepared from 70% isomaltulose, 5% cocoa powder, and 25% water, adding 0.05% acesulfame K or 0.02% sucralose (all in % by weight, relative to the total solution), if applicable. This is done by mixing isomaltulose, the intensive sweetening means, if applicable, and water and heating to 105° C., whereby all crystals are dissolved. The dry substance content is adjusted to 72-74% by weight of dry matter isomaltulose or the total dry substance content to 77-79% by weight of dry matter isomaltulose. The solution thus obtained is then brought to a temperature of 80 to 100° C. and maintained at this temperature throughout the subsequent coating procedure. In order to apply the coating solution to the cereals, 500 g of the isomaltulose solution thus produced are slowly added to 1000 g of the cereals in the rotating drum. Coating is allowed to proceed for 0.5 to 1 minute. The product is dried in a drying facility at a temperature of approx. 130° C. After approx. 10 to 15 minutes, the glass-like coating is essentially dry, but still appears sticky. Therefore, the product obtained is cooled down with air at room temperature for 10 to 20 minutes under agitation before packaging. A non-sticky product is obtained.

EXAMPLE 3

Production of a Cereal Product with Glass-Like Coating Using Highly Concentrated Isomaltulose Solution or Melt Cooked, puffed or extruded cereals, for example rings, small balls, corn flakes or puffed rice, are heated in hot air at 80-95° C. and then inserted into a rotating drum.

An aqueous isomaltulose solution is prepared from 75% isomaltulose and 25% water, adding 0.05% acesulfame K or 0.02% sucralose (all in % by weight, relative to the total solution), if applicable. This is done by mixing isomaltulose, the intensive sweetening means, if applicable, and water and heating to 140 to 150 C., whereby a syrup is obtained. The dry substance content is adjusted to 95-99% TS (dry substance) isomaltulose. Alternatively, isomaltulose can be used in a suitable melting facility at a temperature above the melting point of isomaltulose to produce a melt. The solution or melt thus produced is then adjusted to a temperature of 135° C. and maintained at this temperature throughout the subsequent coating procedure. In order to apply the coating solution to the cereals, 500 g of the isomaltulose solution thus produced are slowly added to 1000 g of the cereals in the rotating drum that was heated to 130° C. Coating is allowed to proceed for 0.5 to 1 minute. After coating, the product is removed from the rotating drum and cooled down in a drying facility with air at room temperature for approx. 10 to 20 minutes under agitation before packaging. A non-sticky product is obtained.

EXAMPLE 4

Production of a Cereal Product Using Isomaltulose as Binding Agent

Formula of the Binding Agent:

| Components | % (by weight) |
| --- | --- |
| Isomaltulose | 60.00 |
| Inulin or oligofructose | 20.00 |
| Water | 20.00 |
| Total | 100.00 |

As an option, the binding agent can contain sucrose, up to 10% of fat and/or up to 0.4% of lecithin.

Formula of the Cereals (Cereal Mixture):

| Components % | (by weight) |
| --- | --- |
| Nutrigrain | 33.00 |
| Wheat bran Mini Crispies | 22.00 |
| coconut flakes | 11.00 |
| Hazel nut pieces | 34.00 |
| Total | 100.00 |

Production:

In a first procedural step, isomaltulose is mixed with inulin or oligofructose and the mixture is heated to boiling in water, whereby a dry substance content of 80 to 82% is adjusted. The binding agent thus produced is mixed with the cereal mixture at a ratio of 20% binding agent and 80% cereal mixture (each in % by weight), and spread with a roller. Subsequently, it is dried in a drier at 130° C. and cut into bars or broken into clusters and then cooled prior to packaging.

EXAMPLE 5

Production of Cereal Beads from Cereal Extrudate

Formula:

| Raw materials | % |
| --- | --- |
| Wheat flour | 66.09 |
| Corn (maize) flour | 16.52 |
| Skimmed milk powder | 4.13 |
| Cocoa powder | 4.13 |
| Salt | 0.41 |
| $NaHCO_3$ | 0.41 |
| Isomaltulose | 8.26 |
| Acesulfame K | 0.05 |
| Total | 100.00 |

Production:

The powders are mixed for 5 minutes at 200 rpm and then transferred to a gravimetric conveyor. They are extruded in a suitable high-shear twin-screw extruder using the standard parameters. Subsequently, the extrudate is cooled down.

Extrusion Parameters (Example)

Extruder:

high-shear twin-screw extruder (Togum): TO EX 45H screw diameter: 45 mm working length: 16× screw diameter Temperature Settings of the Twin-Screw Extruder:

| Setting | |
| --- | --- |
| Supply zone | 20° C. |
| Mixing zone | 145° C. |
| Plasticizing zone | 145° C. |
| Multiple line exit | 145° C. |
| rpm | 200 |

Process Parameters:

| | |
|---|---|
| Pressure | 46 bar |
| Capacity | 22 Nm |

| Dosing | |
|---|---|
| A (powder mixture, gravimetric) | 27 kg/h |
| B (gravimetric) | — |
| C (water, volumetric) | 0.45 kg/h |

The invention claimed is:

1. A method for producing a glazed cereal product, comprising a core made of cereals and a coating, wherein
   a) a coating material
      which is a solution or syrup or melt comprising a total dry matter content of 70 to 100% by weight, in relation to a weight of the solution or syrup, comprising 5 to 100% by weight isomaltulose, in relation to the total dry matter, and having a temperature of at least 80° C., is applied to the core, to produce a resulting coating,
   b) the resulting coating is dried and
   c) a coated, glazed cereal product comprising a cereal core and a glassy, amorphous coating is obtained.

2. A method for producing a glazed cereal product according to claim 1, wherein the coating material is a solution or melt comprising a total dry matter content of 90 to 100% by weight, in relation to the weight of the solution or melt, and having a temperature of at least 135° C., is applied to the core.

3. A method for producing a glazed cereal product according to claim 1, wherein the coating material comprises 20 to 90% by weight of isomaltulose, in relation to total dry matter.

4. A method according to claim 2, wherein the glazed cereal product is selected from the group consisting of granola bars, energy bars, salty snacks and breakfast products.

5. A method according to claim 2, wherein the glazed cereal product is selected from the group consisting of particularly clusters, granola, cornflakes, puffed, corn puffed rice, bite-sized pieces, balls, loops, flakes and crispies.

6. A method according to claim 2, wherein the coating material which is a solution, syrup or melt further comprises at least one additive selected from the group consisting of sweetening agents, high-intensity sweeteners, flavoring agents, spices, dairy products, prebiotics, synbiotics, probiotics, cocoa-containing products, chocolate, fats, resistant starch, β-glucan, rice starch, potato starch, corn starch, supplements, emulsifiers, food-grade acids, soluble and insoluble fibers and oligofructose, stabilizers, vitamins, L-carnitine, omega-3-fatty acids, mineral nutrients, binding agents, dyes and preservatives.

7. A method according to claim 1 wherein the coating material is a solution or syrup comprising a total dry matter content of 70 to 90% by weight and a temperature of 80 to 110° C., and wherein the resulting coating is dried at a temperature in excess of 100° C.

8. A method according to claim 1, wherein the glazed cereal product is selected from the group consisting of granola bars, energy bars, salty snacks and breakfast products.

9. A method according to claim 8, wherein the glazed cereal product is selected from the group consisting of particularly clusters, granola, cornflakes, puffed corn, puffed rice, bite-sized pieces, balls, loops, flakes and crispies.

10. A method according to claim 1, wherein the coating material which is a solution, syrup or melt further comprises at least one additive selected from the group consisting of sweetening agents, high-intensity sweeteners, flavoring agents, spices, dairy products, prebiotics, synbiotics, probiotics, cocoa-containing products, chocolate, fats, resistant starch, β-glucan, rice starch, potato starch, corn starch, supplements, emulsifiers, food-grade acids, soluble and insoluble fibers and oligofructose, stabilizers, vitamins, L-carnitine, omega-3-fatty acids, mineral nutrients, binding agents, dyes and preservatives.

11. A method according to claim 3 wherein the coating material is a solution or syrup comprising a total dry matter content of 70 to 90% by weight and a temperature of 80 to 110° C., and wherein the resulting coating is dried at a temperature in excess of 100° C.

12. A method for producing a frosted cereal product, comprising a core made of cereals and a coating, wherein
   a) a coating solution or syrup or melt comprising 5 to 100% by weight of isomaltulose, in relation to the total dry matter, and having a temperature of 70 to 180° C., is applied to the core, to produce a resulting coating,
   b) the resulting coating is dried at a temperature of 50 to less than 85° C. while being moved, and
   c) a coated, frosted cereal product comprising a cereal core and a crystalline coating is obtained.

13. A method according to claim 12, wherein the frosted cereal product is selected from the group consisting of granola bars, energy bars, salty snacks and breakfast products.

14. A method according to claim 13, wherein the frosted cereal product is selected from the group consisting of particularly clusters, granola, cornflakes, puffed corn, puffed rice, bite-sized pieces, balls, loops, flakes and crispies.

15. A method according to claim 12, wherein the coating solution, syrup or melt further comprises at least one additive selected from the group consisting of sweetening agents, high-intensity sweeteners, flavoring agents, spices, dairy products, prebiotics, synbiotics, probiotics, cocoa-containing products, chocolate, fats, resistant starch, β-glucan, rice starch, potato starch, corn starch, supplements, emulsifiers, food-grade acids, soluble and insoluble fibers and oligofructose, stabilizers, vitamins, L-carnitine, omega-3-fatty acids, mineral nutrients, binding agents, dyes and preservatives.

16. A method according to claim 12 wherein the coating material is a solution or syrup comprising a total dry matter content of 70 to 90% by weight and a temperature of 80 to 110° C., and wherein the resulting coating is dried at a temperature in excess of 100° C.

17. A cereal product, which can be produced by a method according to claim 12, wherein the cereal product comprises
   50 to 95% by weight, in relation to the total dry matter of the cereal product, of cereals and
   5 to 50% by weight, in relation to the total dry matter of the cereal product, of isomaltulose as the coating.

18. A cereal product, which can be produced by a method according to claim 1, wherein the cereal product comprises
   50 to 95% by weight, in relation to the total dry matter of the cereal product, of cereals and
   5 to 50% by weight, in relation to the total dry matter of the cereal product, of isomaltulose as the coating.

19. A method for producing a frosted cereal product according to claim 12, wherein the coating material comprises 20 to 90% by weight of isomaltulose, in relation to total dry matter.

* * * * *